United States Patent [19]
Kidd et al.

[11] Patent Number: 4,479,078
[45] Date of Patent: Oct. 23, 1984

[54] BRUSHLESS MOTOR CONTROLLER

[75] Inventors: H. Keith Kidd, Christianburg; Philip S. Coulon, Jr., Radford, both of Va.

[73] Assignee: Kollmorgen Technologies Corporation, Dallas, Tex.

[21] Appl. No.: 282,796

[22] Filed: Jul. 13, 1981

Related U.S. Application Data

[63] Continuation-in-part of Ser. No. 161,579, Jun. 20, 1980.

[51] Int. Cl.³ .................................... H02K 29/02
[52] U.S. Cl. ............................ 318/254; 318/138; 318/439
[58] Field of Search ................. 318/254, 254 A, 138, 318/439

[56] References Cited

U.S. PATENT DOCUMENTS

| | | | |
|---|---|---|---|
| 3,783,359 | 1/1974 | Malkiel | 318/254 A |
| 3,988,654 | 10/1976 | Takahashi et al. | 318/254 A |
| 4,072,888 | 2/1978 | Bechtle et al. | 318/685 |
| 4,114,073 | 9/1978 | Uzuka | 318/254 A |
| 4,129,813 | 12/1978 | Hunts et al. | 318/696 |
| 4,223,255 | 9/1980 | Goldman | 318/138 |
| 4,249,116 | 2/1981 | Hieda | 318/138 |
| 4,270,074 | 5/1981 | Duckwort et al. | 318/254 |

Primary Examiner—David Smith, Jr.
Attorney, Agent, or Firm—Morgan, Finnegan, Pine, Foley & Lee

[57] ABSTRACT

A brushless D.C. motor control system wherein a read-only memory is used to control the commutated winding energization via drive switching circuits. Position sensors detect the position of the rotor relative to the motor stator and principle digital signals which are used as address inputs for the read-only memory.

10 Claims, 6 Drawing Figures

BRUSHLESS MOTOR CONTROLLER

This is a continuation-in-part of application Ser. No. 161,579, filed June 20, 1980.

BACKGROUND OF THE INVENTION

This invention relates to permanent magnet DC brushless motors and more particularly, to such motors combined with a bi-directional control system.

Permanent magnet DC brushless motors generally include stationary windings, a rotating permanent magnet field and rotor position sensors connected to control winding energization. The energy supplied to the stator windings is usually controlled by solid state drive switches which are selectively rendered conductive by the position sensors in accordance with the rotor position. The drive switches are generally controlled via logic circuits responsive to the position sensor signals as well as other control signals.

The brushless DC motor eliminates the DC commutator as well as other problems commonly associated with the commutator. On the other hand, even though the brushless motor systems can be more reliable and more effective, particularly in high performance servo applications, these results are usually achieved by incorporating relatively complex and expensive switching logic and control circuitry.

An object of this invention is to provide a simpler and less expensive brushless motor control system.

Another objective is to provide a brushless motor wherein the switching circuits and control logic can conveniently be located within the motor housing.

Still another object is to provide a brushless DC motor system wherein bi-directional control and duty cycle modulation control can be achieved at no additional expense.

SUMMARY OF THE INVENTION

In the system according to the invention a bi-polar PROM (programmable read-only memory) is used to control the drive switch circuits. The rotor position is detected by suitable position sensors such as Hall effect devices located to sense rotor leakage flux. The position sensors are connected to the PROM to define a memory address. The output data lines from the PROM are connected to the motor drive switches that control energization of the motor windings. The PROM is programmed so that for a specific address, as defined by the position sensors and other control signals, selected output data lines are energized to activate selected drive switches to in turn energize the motor windings in the appropriate commutated sequence.

In its simplest form, the controller for the brushless motor need include only the position detectors, a PROM, and the drive switches. Bi-directional control and duty cycle modulation control can be readily achieved using the same PROM by appropriate programming corresponding to additional address inputs.

In a preferred embodiment the position sensors are Hall devices located in the motor end bell so as to detect stray magnetic flux from the rotor. The position sensors are spaced from one another by 120 electrical degrees and sense a magnetic condition over approximately 60 electrical degrees. Under these circumstances, the position sensors can provide a three digit indication of six separate positions in a form suitable as a PROM address.

DETAILED DESCRIPTION

Figure 1:
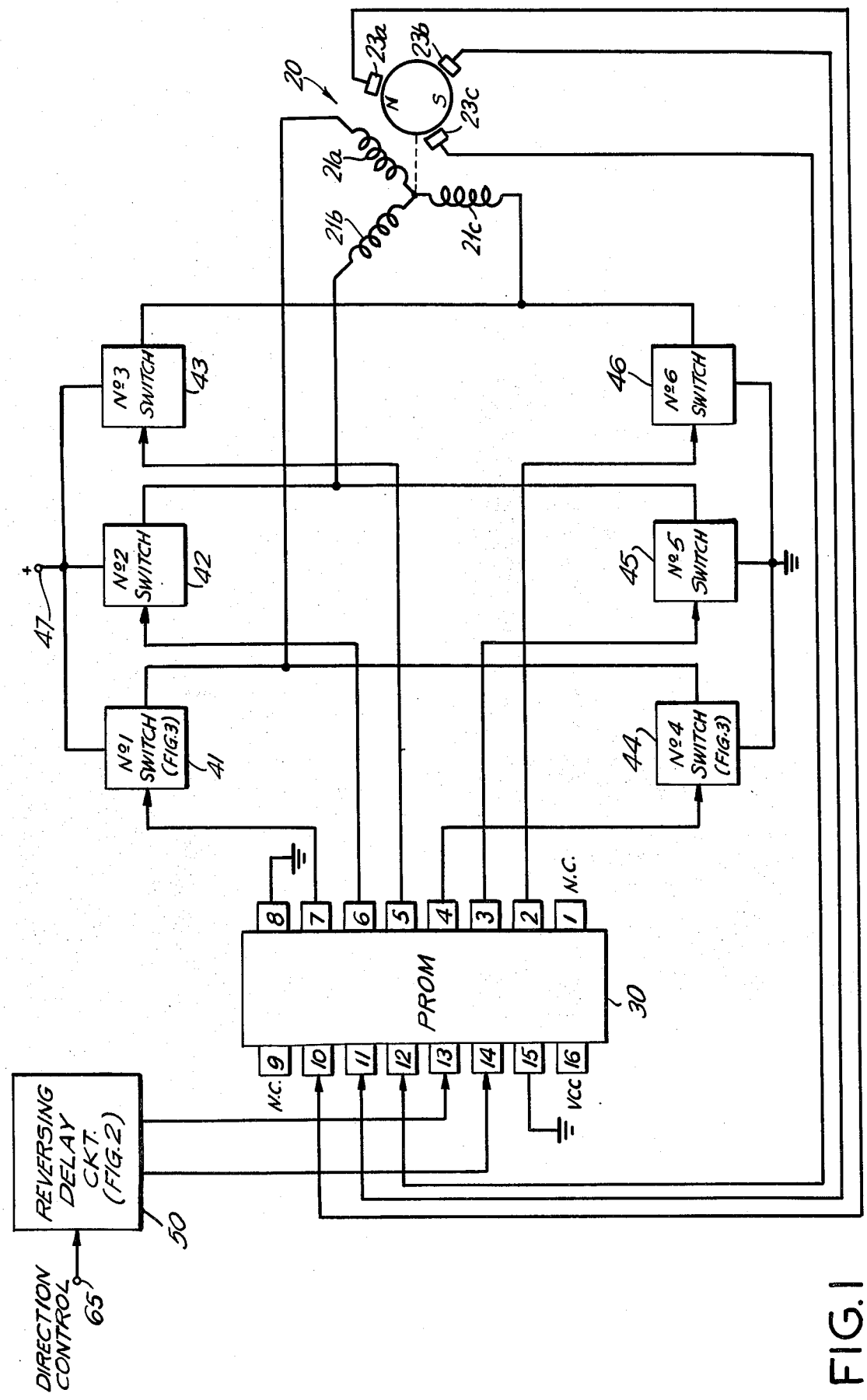
FIG. 1 is a schematic block diagram illustrating a brushless DC motor controller in accordance with the invention.

The brushless DC motor 20 illustrated in FIG. 1 includes three stator windings 21a–21c connected in a wye configuration. The rotor 22 is shown as a two-pole permanent magnet rotor although a greater number of poles can be included. Also, the invention operates equally well with stator windings in a delta configuration.

Hall devices 23a–23c are mounted on the stator to sense leakage flux from the permanent magnet rotor poles. The Hall devices, which act as rotor position sensors, are offset from one another by 120 electrical degrees. Thus, in the case of a two-pole rotor the detectors are located at positions which can be designated as 0°, 120° and 240°. The Hall devices are preferable of the digital type such as Sprague UGS-3020T.

The principal element of the switching control for the motor is PROM (programmable read-only memory) 30 which is preferably an open-collector bi-polar 32×8 programmable read-only memory such as Signetics 82S23. The PROM is a 16 pin integrated circuit wherein pin 16 is connected to a +5 volt source (VCC) and pin 8 is connected to ground. Pins 10-14 are parallel inputs for receiving a memory address and pins 2-7 provide data outputs corresponding to the selected address. Pins 1 and 9 provide additional data outputs which are not used. Pin 15 is connected to ground. The PROM integrated circuit described above is well suited for the particular circuit configuration illustrated although it should be readily apparent that other memory configurations can be used and in more complex systems larger memories may be required.

The Hall devices 23a–23c are connected to pins 10–12, respectively, of PROM 30. A reversing delay circuit 50 responsive to directional controls supplied to a terminal 65 provides two additional address inputs connected to pins 13 and 14 of the PROM.

The six data output lines from the PROM are connected to solid state drive switches 41–46 which control energization of the motor windings. More specifically, pins 7–2 of the PROM are connected to drive switches 41–46, respectively. As will be described hereinafter, the PROM is programmed so that selected ones of the drive switches are activated in accordance with the address supplied by the position detectors and the reversing delay circuit.

Drive switches 41–46 are connected in a three-phase bridge configuration. When in the conductive state, drive switches 41–43 connect the positive power source 47 to the free ends of windings 21a–c, respectively. When in the conductive state switches 44–46 connect the free ends of windings 21a-21c, respectively, to the power supply ground return. The drive switches 41-46 are described more fully hereinafter in connection with FIG. 3. They are so designed that the drive switches become conductive in response to a logic 0 signal from the PROM and are rendered non-conductive in response to a logic 1 signal. Accordingly, if for example drive switches 41 and 46 are simultaneously rendered conductive, current flows through motor windings 21a and 21c. If drive switches 43-44 are simultaneously rendered conductive, current flows through windings 21c and 21a, that is, the same windings but in the reverse direction.

Drive switches 41-46 are transistor switches and, as such, do not turn off instantaneously. It should also be noted that switch pairs such as switches 41 and 44 are connected directly across the power source and, therefore, if both switches of this pair were conductive simultaneously they would short circuit the power source. In the normal sequence of drive switch actuations during rotation in one direction the drive switches change state one at a time in a sequence such that short circuiting of the power source will not occur. However, in a bi-directional motor control system there are situations which occur upon a change of direction where the slight delay in a transistor turn-off will overlap with the turn-on of a new set of drive switches. So that the power supply is not short circuited under these circumstances it is important to provide a time delay of a few microseconds upon a change of direction where all drive switches are turned off so that all transistors can reach the fully non-conductive state. The directional control and the time delay signals are provided by reversing delay circuit 50 connected to pins 13 and 14 of PROM 50.

The data stored in the PROM is set out in Table I below:

TABLE I

| Line No. | Address Outputs | | | | | Data Outputs | | | | | |
|---|---|---|---|---|---|---|---|---|---|---|---|
| | Detectors | | | Dir. | Delay | Drive Switches | | | | | |
| | 23a/10 | 23b/11 | 23c/12 | 13 | 14 | #1/7 | #2/6 | #3/5 | #4/4 | #5/3 | #6/2 |
| 1 | 0 | 0 | 0 | 0 | 0 | 1 | 1 | 1 | 1 | 1 | 1 |
| 2 | 1 | 0 | 0 | 0 | 0 | 1 | 1 | 1 | 1 | 1 | 1 |
| 3 | 0 | 1 | 0 | 0 | 0 | 1 | 1 | 1 | 1 | 1 | 1 |
| 4 | 1 | 1 | 0 | 0 | 0 | 1 | 1 | 1 | 1 | 1 | 1 |
| 5 | 0 | 0 | 1 | 0 | 0 | 1 | 1 | 1 | 1 | 1 | 1 |
| 6 | 1 | 0 | 1 | 0 | 0 | 1 | 1 | 1 | 1 | 1 | 1 |
| 7 | 0 | 1 | 1 | 0 | 0 | 1 | 1 | 1 | 1 | 1 | 1 |
| 8 | 1 | 1 | 1 | 0 | 0 | 1 | 1 | 1 | 1 | 1 | 1 |
| 9 | 0 | 0 | 0 | 1 | 0 | 1 | 1 | 1 | 1 | 1 | 1 |
| 10 | 1 | 0 | 0 | 1 | 0 | 1 | 1 | 1 | 1 | 1 | 1 |
| 11 | 0 | 1 | 0 | 1 | 0 | 1 | 1 | 1 | 1 | 1 | 1 |
| 12 | 1 | 1 | 0 | 1 | 0 | 1 | 1 | 1 | 1 | 1 | 1 |
| 13 | 0 | 0 | 1 | 1 | 0 | 1 | 1 | 1 | 1 | 1 | 1 |
| 14 | 1 | 0 | 1 | 1 | 0 | 1 | 1 | 1 | 1 | 1 | 1 |
| 15 | 0 | 1 | 1 | 1 | 0 | 1 | 1 | 1 | 1 | 1 | 1 |
| 16 | 1 | 1 | 1 | 1 | 0 | 1 | 1 | 1 | 1 | 1 | 1 |
| 17 | 0 | 0 | 0 | 0 | 1 | 1 | 1 | 1 | 1 | 1 | 1 |
| 18 | 1 | 0 | 0 | 0 | 1 | 0 | 1 | 1 | 1 | 0 | 1 |
| 19 | 0 | 1 | 0 | 0 | 1 | 1 | 0 | 1 | 1 | 1 | 0 |
| 20 | 1 | 1 | 0 | 0 | 1 | 0 | 1 | 1 | 1 | 1 | 0 |
| 21 | 0 | 0 | 1 | 0 | 1 | 1 | 1 | 0 | 0 | 1 | 1 |
| 22 | 1 | 0 | 1 | 0 | 1 | 1 | 1 | 0 | 1 | 0 | 1 |
| 23 | 0 | 1 | 1 | 0 | 1 | 1 | 0 | 1 | 0 | 1 | 1 |
| 24 | 1 | 1 | 1 | 0 | 1 | 1 | 1 | 1 | 1 | 1 | 1 |
| 25 | 0 | 0 | 0 | 1 | 1 | 1 | 1 | 1 | 1 | 1 | 1 |
| 26 | 1 | 0 | 0 | 1 | 1 | 1 | 0 | 1 | 0 | 1 | 1 |
| 27 | 0 | 1 | 0 | 1 | 1 | 1 | 1 | 0 | 1 | 0 | 1 |
| 28 | 1 | 1 | 0 | 1 | 1 | 1 | 1 | 0 | 0 | 1 | 1 |
| 29 | 0 | 0 | 1 | 1 | 1 | 0 | 1 | 1 | 1 | 1 | 0 |
| 30 | 1 | 0 | 1 | 1 | 1 | 1 | 0 | 1 | 1 | 1 | 0 |
| 31 | 0 | 1 | 1 | 1 | 1 | 0 | 1 | 1 | 1 | 0 | 1 |
| 32 | 1 | 1 | 1 | 1 | 1 | 1 | 1 | 1 | 1 | 1 | 1 |

The five left-most columns of Table 1 set forth the various addresses defined by data input signals on pins 10-14 of the PROM. Going from left to right, the first column indicates the position signal from Hall device 23a connected to pin 10 (23a/10), the next column is the signal from Hall device 23b connected to pin 11 (23b/11), the next column indicates the signal from Hall device 23c connected to pin 12 (23c/12), the next column is the direction signal on pin 13 and the last column is the delay signal on pin 14.

The columns to the right in Table 1 indicate the status of the 6 data outputs used to control the drive switches. Reading from left to right, the first column indicates the logic level for switch 41, also designated Switch #1 appearing on pin 7 (#1/7) and the succeeding columns indicate the logic level supplied to drive switches 42-46 also designated switches #2-#6, from pins 6-1, respectively, (#2/6 to #6/1).

If all of the address inputs on pins 10-14 are logic level zero, for example as indicated in line 1 of Table 1, all of the output data lines will show a logic 1 level rendering all of the drive switches non-conductive. As another example, as in line 19, where the address inputs are 01001, the data outputs are 110101 which would render drive switches #3 and #5 are rendered conductive whereas the the remaining drive switches would be rendered non-conductive. In this manner, the status of the drive switches is controlled in accordance with the address signals supplied to PROM 50.

Figure 4:
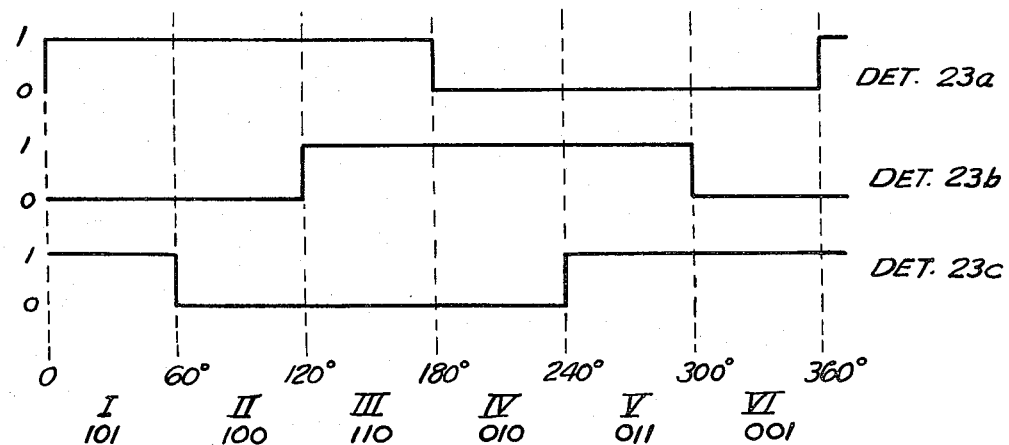
FIG. 4 is a diagram illustrating the signals produced by the position sensors.

The signals generated by the Hall devices during rotation through 360 electrical degrees are shown in FIG. 4. As the rotor rotates, detector 23a provides an output signal at a logic 1 level for the first 180 electrical degrees and then provides a logic 0 level for the next 180°. Hall device 23b provides a logic 0 level for the 120 electrical degrees, then provides a logic 1 level for the next 180° and provides a logic 0 level for the remaining 60°. Hall device 23c provides a logic 1 level for the first 60°, a logic 0 level for the next 180° and a logic 1 level for the final 120°. Thus, 360 electrical degrees of rotation is divided into six separate zones designated I through VI in FIG. 4, each zone having a unique digital designation provided by the Hall devices. Reading left to right the successive digital designations are 101, 100, 110, 010, 011 and 001. This particular sequence is not unique since there are other arrangements that would also provide appropriate designations for the six separate zones.

Figure 5A:
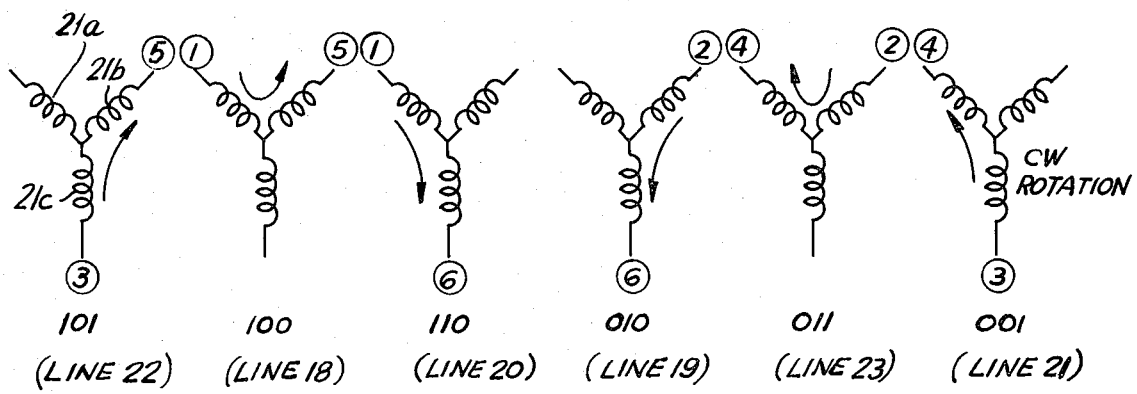
FIGS. 5A and 5B are diagrams illustrating the sequential energization of the stator windings according to the invention.

FIG. 5a illustrates the sequence of winding energization during one revolution of the motor in the clockwise direction indicated by a logic zero, i.e., according to lines 18–23 in Table I. In the initial position the position sensors provide a 101 position designation which translates into a data output 110101 from the PROM according to line 22 of Table I. This data output renders switch #3 and switch #5 (switches 42 and 46 in FIG. 1) conductive and therefore current flows through windings 21c and 21b as shown in left-most diagram in FIG. 5a. Similarly, the position designations 100, 110, 010, 011 and 001 appearing on lines 18, 20, 19, 23 and 21, respectively in Table I, provide the sequence of winding energization shown in FIG. 5a going from left to right.

Figure 5B:
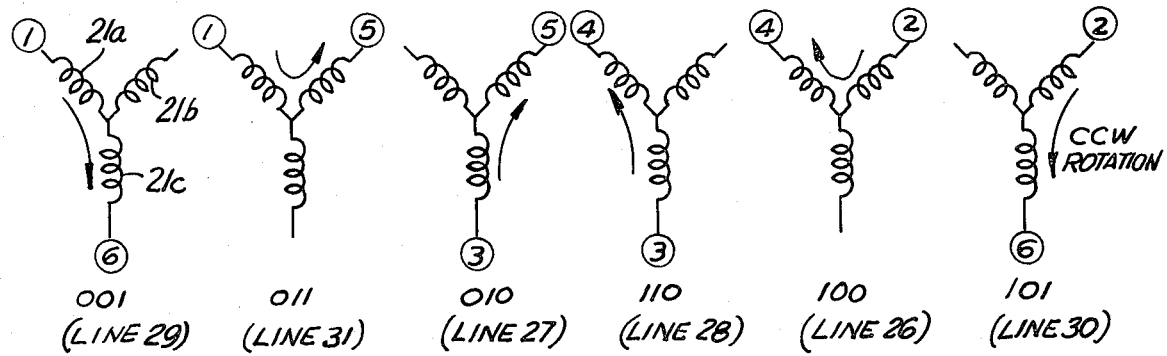

FIG. 5b shows the sequence of energization for the windings for the counter-clockwise direction indicated by a logic 1 signal, i.e., according to lines 26 through 31 in Table I. For position 001, the data output appearing on line 29 renders switch #1 and switch #6 conductive so that current flows through windings 21a and 21c as shown in the left-most diagram of FIG. 5b. The succeeding position indications 011, 010, 110, 100 and 101 provide the sequence of winding energizations shown in FIG. 5b moving from left to right.

Figure 2:
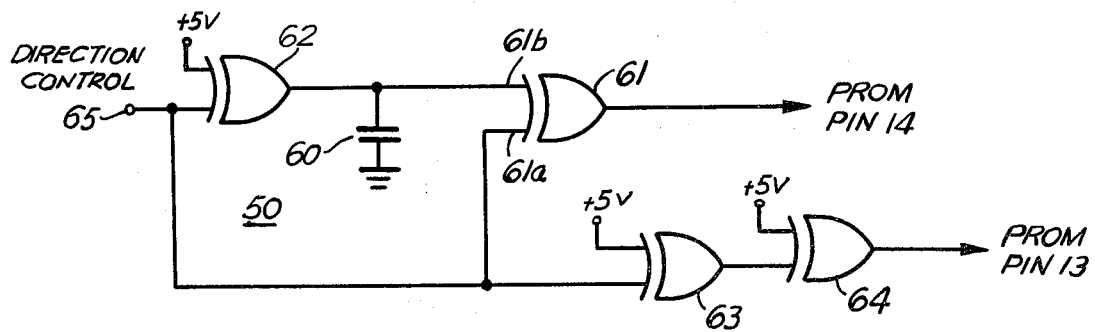
FIG. 2 is a schematic diagram illustrating details of the reversing delay circuit for the system shown in FIG. 1.

The reversing delay circuit 50 is shown in more detail in FIG. 2 and includes an exclusive OR circuit 61 and a capacitor 60. Since exclusive OR integrated circuits are normally packaged in a quad configuration, use is made of the other exclusive OR circuits 62–64 by tying one input of each to the +5 Volt supply so they function as inverting amplifiers.

The direction control signal at terminal 65 is connected to the free input of circuit 62 and the output thereof is connected to one input 61b of exclusive OR circuit 61. Capacitor 60 (0.47 micro farads) is connected between the output of circuit 62 and ground to provide a time delay of several microseconds. Terminal 65 is connected to the other input 61a of exclusive OR circuit 61 and the output of circuit 61 is connected to pin 14 of PROM 30 (FIG. 1) to provide a control delay pulse upon a change of direction command. The directional input signal at terminal 65 is also supplied to pin 13 of PROM 30 via circuits 63 and 64 which function as inverting amplifiers.

In operation, if the circuit receives a direction input signal which is logic 0 (zero signal), the output of circuit 62 is at the logic 1 level and therefore capacitor 60 is charged to a positive value. Under these circumstances input 61b is at a logic 1 level and input 61a is at a logic 0 level so that the output of exclusive OR circuit 61 is logic 1.

If the signal at terminal 65 changes to a logic 1 indicating a change of motor direction, this change in logic level appears immediately at input 61a but no change appears at input 61b until capacitor 60 discharges. Since both inputs on exclusive OR circuit 61 momentarily are at the logic 1 level, a pulse at logic zero appears at the output of circuit 61. In similar fashion a change of direction from logic 1 to logic 0 at terminal 65 produces a similar pulse at the output of circuit 61 while capacitor 60 charges.

Thus, each time the direction command signal supplied to terminal 65 changes, a logic zero pulse appears at the output of circuit 61 of a duration determined by the size of capacitor 60 and this delay control pulse is supplied to pin 14 of the PROM.

As can be seen from Table I a logic 0 signal on pin 14 of the PROM causes all data outputs to be at the logic 1 level and hence causes all switching circuits to become non-conductive. Thus, the input on pin 14 overrides all other inputs to the PROM and turns off all the drive switches.

This type of override control can also be usefully employed to achieve other motor control functions such as pulse width speed control. Such a pulse width control system is described in an application entitled "Control System for Electrical Motor" filed in the name of H. Keith Kidd on even date herewith.

Figure 3:
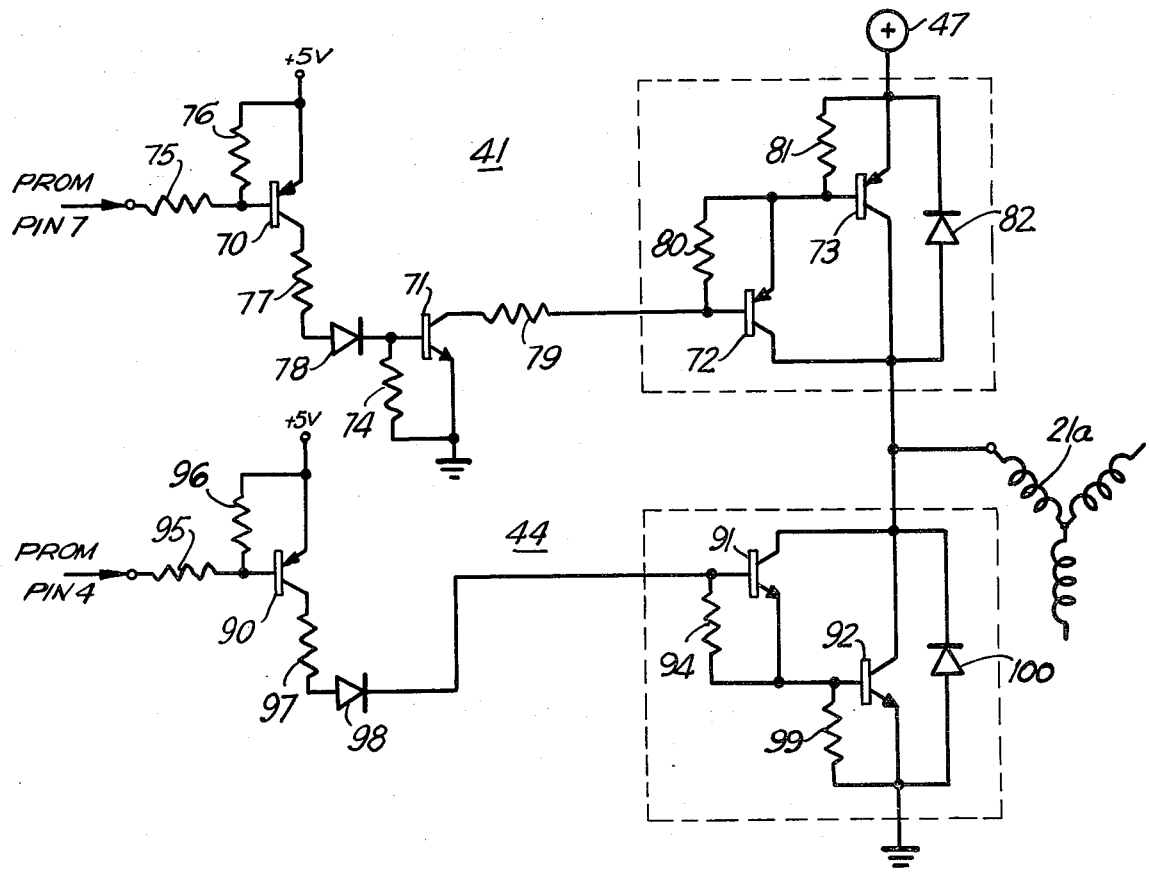
FIG. 3 is a schematic diagram showing details for a pair of motor drive switches of the type used in the system shown in FIG. 1.

Drive switch pair 41 and 44 connected to stator winding 21a is shown schematically in more detail in FIG. 3. Drive switch pair 42 and 45 connected to stator winding 21b and drive switch pair 43 and 46 are each similar to the drive switch pair shown in FIG. 3.

Drive switch circuit 41, shown in the upper portion of FIG. 3, includes transistors 70 and 71 that provide a buffered base drive for the main switch transistors 72 and 73 which are interconnected in a Darlington configuration.

Pin 7 of PROM 30 (FIG. 1) is connected to the base of a PNP transistor 70 via a resistor 75. The emitter of the transistor is connected to the positive source and a resistor 76 is connected across the emitter-base circuit of the transistor. The collector of transistor 70 is connected to the base of a NPN transistor 71 via a resistor 70 in series with an isolating diode 78. A resistor 74 is connected between the base and the grounded emitter of transistor 71. The collector of transistor 71 is connected to the base of PNP type transistor 72 via resistor 79 and a resistor 80 is connected across the emitter-base circuit. The emitter of transistor 72 is connected to the base of PNP type transistor 73. The common collector junction of transistors 72 and 73 is connected to the free end of stator winding 21a. The emitter of transistor 73 is connected to the positive source 47 and resistor 81 is connected across the emitter base circuit. Diode 82, poled in the reverse direction, is connected across the emitter collector circuit of transistor 73.

If the signal at pin 7 is positive, i.e., at a logic 1 level, transistors 70–73 are rendered non-conductive. On the other hand, if the signal from pin 7 drops to zero, i.e, logic level zero, this drop in potential renders transistor 70 conductive which in turn raises the potential at the base of transistor 71 rendering that transistor conductive which in turn drops the base potential on transistors 72 and 73 of the Darlington circuit to render these transistors conductive. The circuit components are selected so that the approximately zero potential at the base of transistor 70 drives the transistors into a fully conductive saturated state and therefore, under these conditions stator winding 21a, in effect, is directly connected to the positive source 47.

The companion drive switch 44 includes a PNP type transistor 90 which provides a buffered base drive for NPN transistors 91 and 92 which are connected in the Darlington configuration.

Pin 4 from PROM 30 is connected to the base of transistor 90 through a resistor 95. The emitter is connected to the positive source and a resistor 96 is connected across the emitter-base circuit. The collector of transistor 90 is connected to the base of transistor 91 of the Darlington circuit via a resistor 97 and an isolating diode 98. The collectors of transistors 91 and 92 are connected to the free end of stator winding 21a whereas the emitter of transistor 91 is connected to the base of transistor 92 and the emitter of transistor 92 is connected to ground. Resistors 94 and 99 are connected across the base-emitter circuits of transistors 91 and 92, respectively. Diode 100 is poled in the reverse direction and is connected across the collector-emitter circuit of transistor 92.

If the signal from the PROM is positive, i.e., logic 1, transistors 90-92 are rendered non-conductive. If the signal from the PROM drops to zero, i.e., logic zero, this drop in potential renders transistor 90 conductive which in turn raises the potential at the bases of transistors 91 and 92 to likewise drive these transistors into a fully conductive state. Thus, a logic zero signal on pin 4 of the PROM renders drive transistors 91 and 92 fully conductive and therefore, in effect, connects the free end of winding 21a to ground.

Since there are relatively few components in the motor controller according to this invention as illustrated in FIG. 1, the components can conveniently be mounted on a circular printed circuit board roughly the same diameter as the motor. Such a printed circuit board including the Hall devices can be mounted so that the leakage flux from the discrete permanent magnet rotor poles is sensed by the board mounted digital Hall devices. Preferably the Hall devices in such an arrangement would be provided with adjustable permanent magnets which can be used as trimmers so that each Hall device senses a magnetic condition over 60 electrical degrees.

It should be apparent to those skilled in the art that there are many possible variations within the scope of this invention which is the more particularly defined in the appended claims.

We claim:

1. A DC brushless motor control system comprising a motor including,
   a plurality of stator windings,
   a permanent magnet rotor, and
   a plurality of position sensors for providing a digital indication of the rotor position;
   solid state drive switches for selectively energizing said stator windings from a DC source;
   a read only memory device,
      said read only memory device being connected to receive said digital indications from said position sensors as memory addresses,
      said read only memory device being programmed to provide data output sets in response to said addresses for activating selected ones of said drive switches, and
      said data output sets from said read only memory device being connected to control the states of said drive switches so that at least two of said drive switches are rendered conductive at each active motor drive data output set;
      said read only memory device being further connected to receive a control signal at an additional address input and wherein
   said read only memory device is programmed to render all of said drive switches nonconductive when said control signal is present.

2. A motor control system according to claim 1 wherein said motor includes three stator windings connected in a wye configuration and three position sensors separated from one another by 120 electrical degrees.

3. A motor control system according to claim 1 wherein said position sensors are Hall devices.

4. A motor control system according to claim 3 wherein said position sensors are located to sense rotor leakage flux.

5. A motor control system according to claim 1 wherein said position sensors are three Hall devices separated 120 electrical degrees and located to each sense leakage flux over about 60 electrical degrees.

6. A DC brushless motor control system comprising:
   a motor including,
      a plurality of stator windings,
      a permanent magnet rotor, and
      a plurality of position sensors for providing a digital indication of the rotor position;
   solid state drive switches for selectively energizing said stator windings;
   means providing a direction signal;
      a reversing delay circuit responsive to said direction signal and operative to provide a delay control pulse in response to each change of direction;
   a digital memory device,
      said memory device being connected to receive said digital indications from said position sensors, said direction signal and said delay control pulse as address inputs
      said memory device providing a plurality of data outputs each connected to one of said drive switches to control the drive switches in accordance with the logic state of the data outputs
      said memory device being programmed to provide data outputs rendering all drive switches non-conductive during the presence of said delay control pulse, and
      said memory device being programmed to provide data outputs for rendering selected ones of said drive switches conductive in response to said digital indications and said direction signal in the absence of said delay pulse.

7. A motor control system according to claim 6 wherein said position sensors are Hall devices located to sense rotor leakage flux.

8. A motor control system according to claim 7 wherein said motor includes three stator windings connected in a wye configuration and three position detectors separated from one another by 120 electrical degrees and each operable to sense leakage over about 60 electrical degrees.

9. A motor control system according to claim 8 wherein said three position sensors indicate six rotor positions in a three digit code supplied to said memory device as address inputs.

10. A DC brushless motor control system comprising a motor including,
   a plurality of stator windings,
   a permanent magnet rotor, and
   a plurality of position sensors for providing a digital indication of the rotor position;

solid state drive switches for selectively energizing said stator windings; a read only memory device, said read only memory device being connected to receive said digital indications from said position sensors as memory addresses, said read only memory device being programmed to provide data outputs in response to said addresses for activating selected ones of said drive switches, said data outputs from said read only memory device being connected to control the states of said switches;

said read only memory device being further connected to receive a control signal at an additional address input and wherein said read only memory device is programmed to render all of said drive switches nonconductive when said control signal is present; and a reversing delay circuit for sensing a command for reversing motor direction and operative to provide said control signal in the form of a delay pulse following each such change in motor direction.

* * * * *